United States Patent [19]

Rao et al.

[11] Patent Number: 4,575,313

[45] Date of Patent: Mar. 11, 1986

[54] DIGITAL PRESSURE CONTROLLER

[75] Inventors: Prabhakar P. Rao; Jim B. Surjaatmadja; Jack C. Penn, all of Duncan, Okla.

[73] Assignee: Halliburton Company, Duncan, Okla.

[21] Appl. No.: 651,978

[22] Filed: Sep. 19, 1984

Related U.S. Application Data

[62] Division of Ser. No. 463,219, Feb. 2, 1983, abandoned.

[51] Int. Cl.[4] .............................................. F04B 49/00
[52] U.S. Cl. ........................................ 417/26; 138/31; 417/44; 417/63; 417/317; 417/505
[58] Field of Search .............. 417/505, 404, 317, 316, 417/507, 44, 45, 26, 28, 63; 415/27; 138/26, 30, 31

[56]  References Cited

U.S. PATENT DOCUMENTS

| | | | |
|---|---|---|---|
| 2,986,898 | 6/1961 | Wood | 417/404 X |
| 3,424,370 | 1/1969 | Law | 415/27 X |
| 3,720,487 | 3/1973 | Wiley | 138/31 X |
| 4,093,404 | 6/1978 | Soehngen et al. | 417/317 |
| 4,248,268 | 2/1981 | Choate | 138/31 X |
| 4,321,014 | 3/1982 | Eburn et al. | 417/5 |

Primary Examiner—Edward K. Look
Attorney, Agent, or Firm—E. Harrison Gilbert, III; James R. Duzan; Thomas R. Weaver

[57]  ABSTRACT

A pressure controller includes a set point switch mechanism by which a selectable pressure to be maintained in a pressure vessel can be set. The actual pressure in the pressure vessel is detected and converted into a corresponding electrical signal by a suitable pressure transducer. Electrical signals from the set point switch mechanism and the transducer are utilized by a computer to generate control signals for controlling a volume adjustment mechanism which adjusts the effective volume of the pressure vessel and adjusts the quantity of pressurizing fluid disposed in the vessel. The volume adjustment mechanism includes a piston disposed in a cavity which is connectable with the chamber of the pressure vessel. The volume adjustment mechanism also includes a stepper motor which can be moved in precise increments to adjust the position of the piston in the cavity.

4 Claims, 8 Drawing Figures

DIGITAL PRESSURE CONTROLLER

This application is a divisional application of Ser. No. 463,219 filed Feb. 2, 1983 now abandoned.

This invention relates generally to apparatus for controlling pressure and more particularly, but not by way of limitation, to a pressure controller for controlling high pressures in a chamber used for analyzing cement to be used in a borehole of an oil or gas well.

In testing the characteristics of materials, it is often desirable to place the material in an environment in which the pressure can be controlled so that the effects of various pressures on the material can be determined. For example, in the oil and gas industry, cement which is to be used for various purposes in well drilling and oil and/or gas recovery operations must be analyzed to determine if it will be able to withstand the various pressures to be encountered at various depths of the downhole environment. Because there are differences between types of cement and between batches of the same type of cement, there is needed a pressure controller means for readily testing the pressure effects on each particular batch of cement prior to pumping it downhole.

To appropriately apply pressure to the material to be tested, it is also desirable that the means be precisely controllable about a selectable set point.

To enable one to variably control the pressure to be applied to the material, there is also needed a means by which the pressure can be steadily increased or decreased over time.

To facilitate the overall operation, it is also desirable that such pressure controller means be able to both initially pressurize the pressure chamber up to the set point and then to subsequently precisely control the pressure in the chamber about the selected set point. During the control period, it should also be capable of acting as a relief valve, if necessary.

The present invention meets the aforementioned needs by providing a novel and improved pressure controller. The pressure controller of the present invention precisely controls pressure in a pressure chamber about a set point which is selectable. Precise control is achieved by varying the effective volume of the pressure chamber by precise, discrete increments. Still further, the present invention is capable of pumping a fluid into or out of the chamber to pressurize or relieve the pressure chamber. The present invention also enables one to apply a selectable steady pressure increase or decrease (i.e., a pressure ramp) to the pressure chamber.

Broadly, the present invention provides an apparatus for controlling the pressure in a chamber. The apparatus comprises set point means for setting a magnitude of pressure which is to be maintained in the chamber. The apparatus also includes detector means for detecting the actual pressure in the chamber. Still another element of the apparatus is a volume adjustment means for adjusting the effective volume of the chamber and for adjusting the quantity of a fluid disposed in the effective volume of the chamber. The apparatus also comprises volume adjustment controller means for controlling the volume adjustment means when a range predetermined by the detected actual pressure plus or minus a predetermined tolerance or deadband, if any, does not include the magnitude of pressure which is to be maintained in the chamber. The volume adjustment controller means functions in response to the set point means and the detector means.

Therefore, from the foregoing, it is a general object of the present invention to provide a novel and improved pressure controller.

Other and further objects, features and advantages of the present invention will be readily apparent to those skilled in the art when the following description of the preferred embodiments is read in conjunction with the accompanying drawings.

Figure 1:
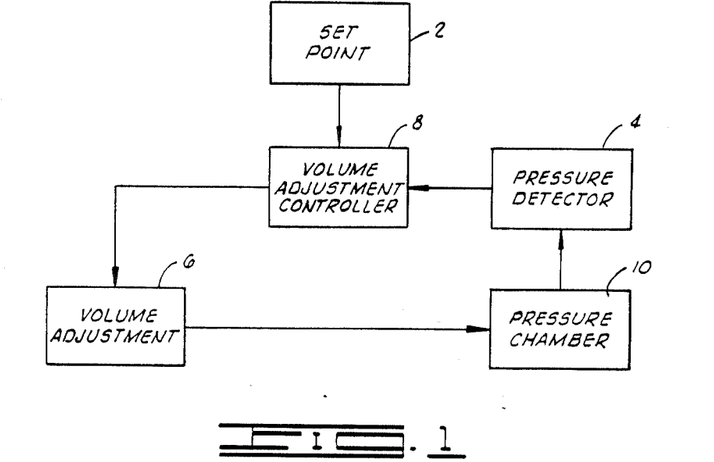
FIG. 1 is a block diagram of the present invention.

With reference to FIG. 1, the present invention is shown to include set point means 2, pressure detector means 4, volume adjustment means 6, and volume adjustment controller means 8 which function together to control the pressure in a pressure chamber 10, such as an autoclave used in ultrasonic cement analyzer systems and consistometers of types known to the art. The elements 2, 4, 6 and 8 will be described with reference to a first preferred embodiment illustrated in FIGS. 2 and 3 and with reference to a second preferred embodiment illustrated in FIGS. 4–8.

Figure 2:
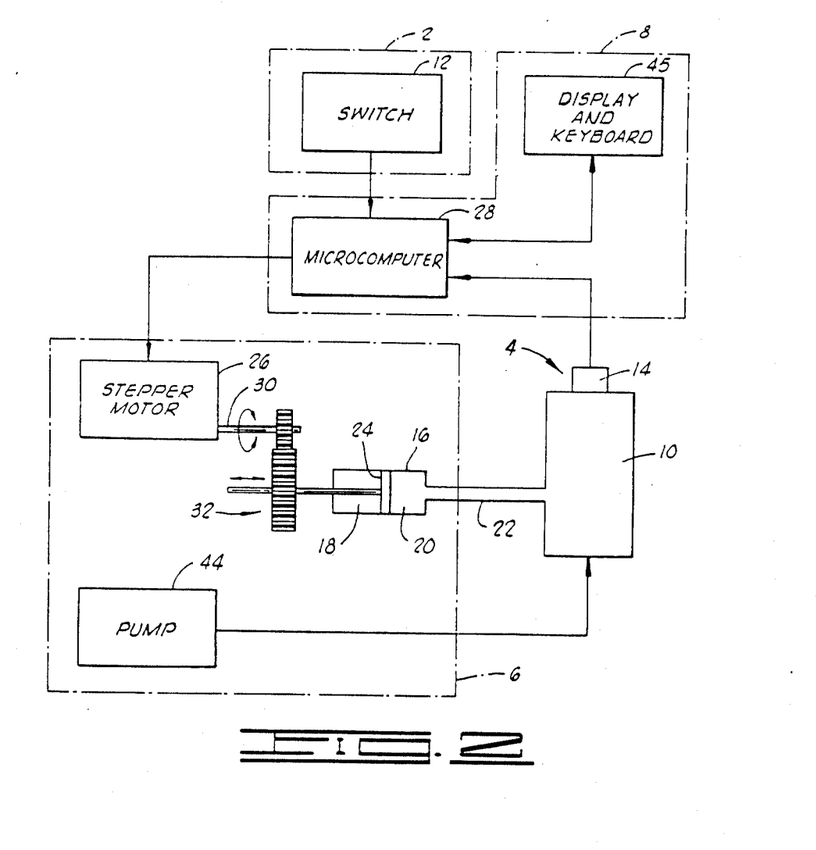
FIG. 2 is a block and schematic diagram of a first preferred embodiment of the present invention.

The set point means 2 is used for setting a magnitude of pressure which is to be maintained in the chamber 10. In FIG. 2, the chamber 10 is illustrated as any suitable type of high pressure chamber (e.g., an autoclave) capable of withstanding the pressures used for testing cement which is to be used in a borehole; however, the present invention can be used with other types of pressure chambers. The set point means 2 is shown in FIG. 2 to include a switch means 12, such as a thumbwheel switch or a keyboard. By manually manipulating the switch means 12, a selectable magnitude of pressure can be entered in the present invention. In the preferred embodiment when the switch means 12 is set, one or more electrical signals is established to provide a digital representation of the selected magnitude of pressure to be maintained in the chamber 10. These digital signals are provided to the volume adjustment controller means 8.

The volume adjustment controller means 8 receives additional electrical signals which are generated by the pressure detector means 4. In the preferred embodiment illustrated in FIG. 2, the pressure detector means 4 specifically includes a suitable transducer 14 which responds to the pressure in the chamber 10 and generates an electrical signal in proportion to the detected pressure. The signal or signals from the transducer 14 and the signal or signals from the switch means 12 are used by the volume adjustment controller means 8 to control the volume adjustment means 6.

In response to the control from the volume adjustment controller means 8, the volume adjustment means 6 adjusts the effective volume of the chamber 10. The volume adjustment means 6 also adjusts the quantity of a pressurizing fluid disposed in the effective volume of the chamber 10. As shown in FIG. 2, the first preferred embodiment of the volume adjustment means 6 includes a body 16 schematically illustrated as a cylinder having a cavity defined therein by an interior side wall of the body 16. The cavity is shown in FIG. 2 to include a first portion 18 and a second portion 20. The cavity portion 20 is placed in fluid communication with the chamber 10 by suitable conductor means such as a conduit 22.

The volume adjustment means 6 also includes a member, such as a piston 24, movably disposed in the cavity. The piston 24 defines the extent or size of the portion which is in fluid communication with the chamber 10. That is, the position of the piston 24 defines the volume of the cavity portion 20 (and also the cavity portion 18). The position of the piston 24 is varied by means of a motor means, illustrated as a stepper motor 26, for moving the piston 24 to vary the size of the portion 20 which is in fluid communication with the chamber 10. Because the portions 18 and 20 constitute the entire cavity of the body 16, which cavity is finite, as the volume or size of the portion 20 is made larger, the volume or size of the portion 18 is necessarily made smaller and vice-versa.

The stepper motor 26 in the preferred embodiment illustrated in FIG. 2 includes a rotary motor which is responsive to digital control signals from the volume adjustment controller means 8 illustrated in FIG. 2 to include a microcomputer means 28. The stepper motor means 26 is of a type known to the art. The stepper motor means includes a drive shaft 30 which is rotatable in either direction for turning gears 32 by which the drive shaft 30 and the shaft of the piston 24 are coupled. Rotation occurs in discrete, predetermined increments. The gears 32 couple the drive shaft 30 and the shaft of the piston 24 so that when the drive shaft 30 rotates, the piston 24 moves linearly along the side wall defining the cavity of the cylinder 16. This can be accomplished by using a threaded piston shaft as illustrated in FIG. 3.

Figure 3:
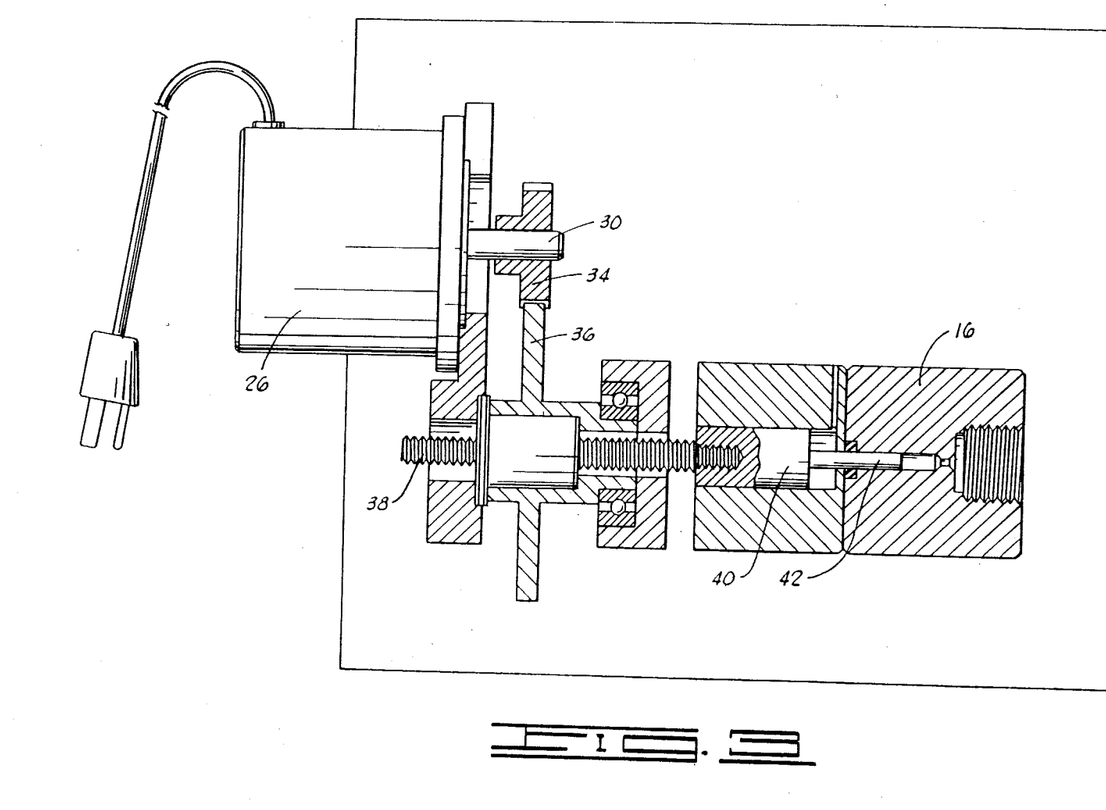
FIG. 3 is a partial sectional plan view of a part of the volume adjustment means of the first preferred embodiment.

FIG. 3 shows the stepper motor 26 having the driven shaft 30 on which a first gear 34 is mounted. The first gear 34 meshes with a second gear 36. Associated with the second gear 36 is a threaded shaft 38 forming the shaft of the piston 24 which is shown in FIG. 3 to include a piston head 40 from which a protuberant portion 42 extends. The piston head 40 and protuberant portion 42 are disposed in the cavity of the cylinder 16.

Upon operation of the stepper motor 26, the shaft 38 and attached piston head 40 and protuberant portion 42 are advanced into or retracted from the forward portion 20 of the cavity of the cylinder 16, which forward portion 20 is in fluid communication with the chamber 10 via the conduit 22. Such advancement or retraction decreases or increases, respectively, the effective volume of the chamber 10 thereby increasing or decreasing, respectively, the pressure exerted by the constant quantity of pressurizing fluid contained in the effective volume.

The pressurizing fluid which is contained within the effective volume is pumped into the effective volume by a suitable pump means 44 of a type known to the art. The pump means 44 is part of the volume adjustment means 6 of the first embodiment and is used in the first preferred embodiment to bring the pressure in the chamber 10 up to or near the set point pressure as entered by the switch means 12. Once the pressure in the chamber 10 is brought into the vicinity of the set point pressure, the microcomputer 28 of the first preferred embodiment takes control. In the preferred embodiment the fluid pumped by the pump means 44 is highly noncompressible so that a small change in the effective volume of the chamber 10 causes a significant pressure change as exerted by the fluid contained therein.

The microcomputer means 28 of the volume adjustment controller means 8 is any suitable microcomputer which is suitably programmed. One suitable program can be derived from the flow chart shown in FIG. 8, which flow chart is specifically for the second preferred embodiment, but which can be easily modified for controlling the first preferred embodiment as readily known to the art. The microcomputer means 28 includes means for rotating the drive shaft in a first direction, thereby moving the piston 24 in a first direction to decrease the size of the portion of the cavity 20 in fluid communication with the chamber 10, when the actual pressure (minus any predetermined tolerance or deadband) detected by the transducer means 14 is less than the magnitude of the set point pressure which is to be maintained in the chamber 10. This movement in the first direction increases the pressure in the chamber 10. The microcomputer means 28 also includes means for rotating the drive shaft in a second direction, thereby moving the piston 24 in a second direction to increase the size of the portion 20 in fluid communication with the chamber 10, when the detected actual pressure (plus any predetermined tolerance or deadband) is greater than the magnitude of the set point pressure which is to be maintained in the chamber 10. This movement in the second direction decreases the pressure in the chamber 10. More generally, the microcomputer means 28 provides means for actuating the motor means in response to the electrical signals provided by the switch means 12 of the set point means 2 and the transducer means 14 of the pressure detector means 4.

The microcomputer means 28 is also responsive to inputs manually entered by an operator through a keyboard portion of a display and keyboard means 45. Such inputs can include parameters by which a pressure ramp for steadily increasing or decreasing the pressure in the chamber 10 is defined, for example. The microcomputer means 28 also provides outputs to the display portion of the means 45 for displaying the pressure detected in the chamber 10, for example. The interfacing (both hardware and software) between the microcomputer means 28 and the display and keyboard means 45 is of a type readily known to the art.

Figure 6:
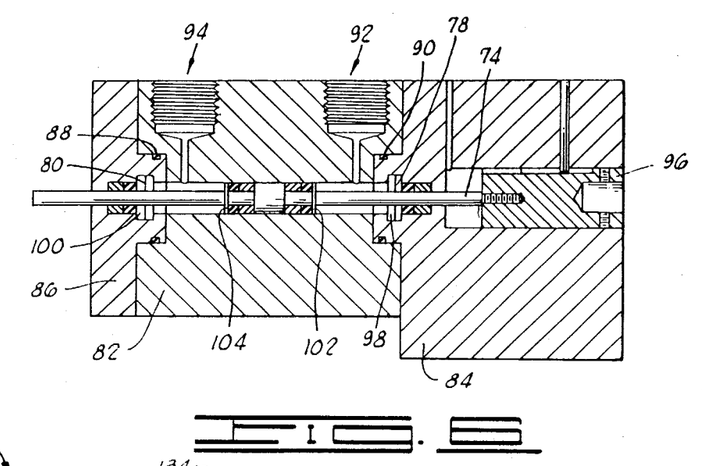
FIG. 6 is a sectional view of the pump body and piston of the volume adjustment means of the second preferred embodiment.
Figure 7:
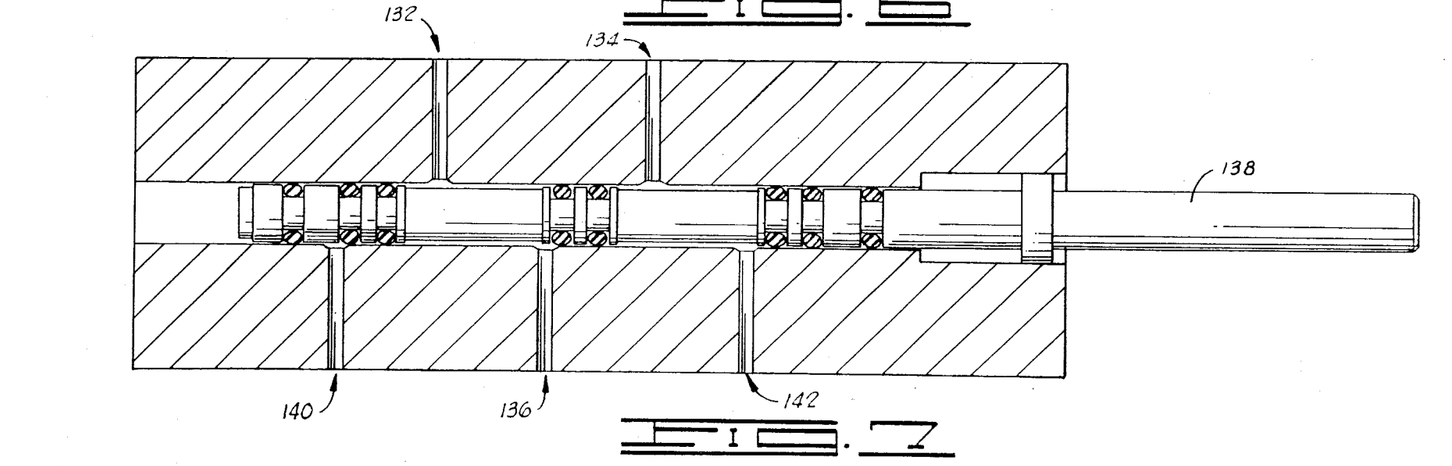
FIG. 7 is a sectional view of an alternative embodiment valve of the volume adjustment means of the second preferred embodiment.
Figure 8:
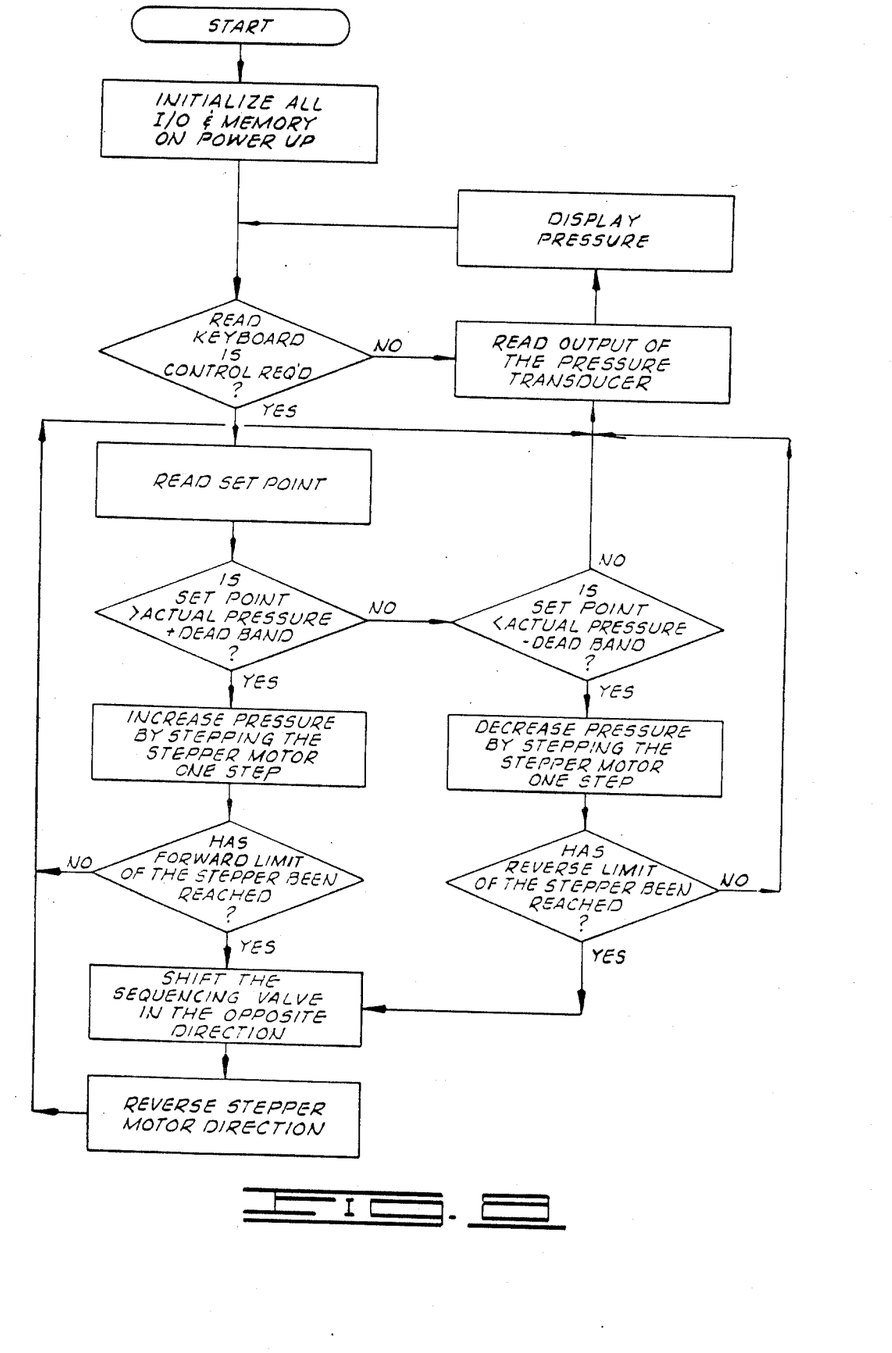
FIG. 8 is a flow chart of a program for the microcomputer of the second preferred embodiment.

Referring to FIGS. 4-8, the second preferred embodiment of the present invention will be described. In the second preferred embodiment there are included elements similar to the switch means 12, the transducer means 14, the microcomputer means 28, and the display and keyboard means 45; these similar elements are designated in the second preferred embodiment by the reference numerals 12a, 14a, 28a, and 45a, respectively. Because of these similar elements, only the second preferred embodiment of the volume adjustment means 6 will be particularly described. It is to be noted that the flow chart of the preferred embodiment program for the microcomputer means 28a is shown in FIG. 8 and is believed to be self-explanatory.

Figure 4:
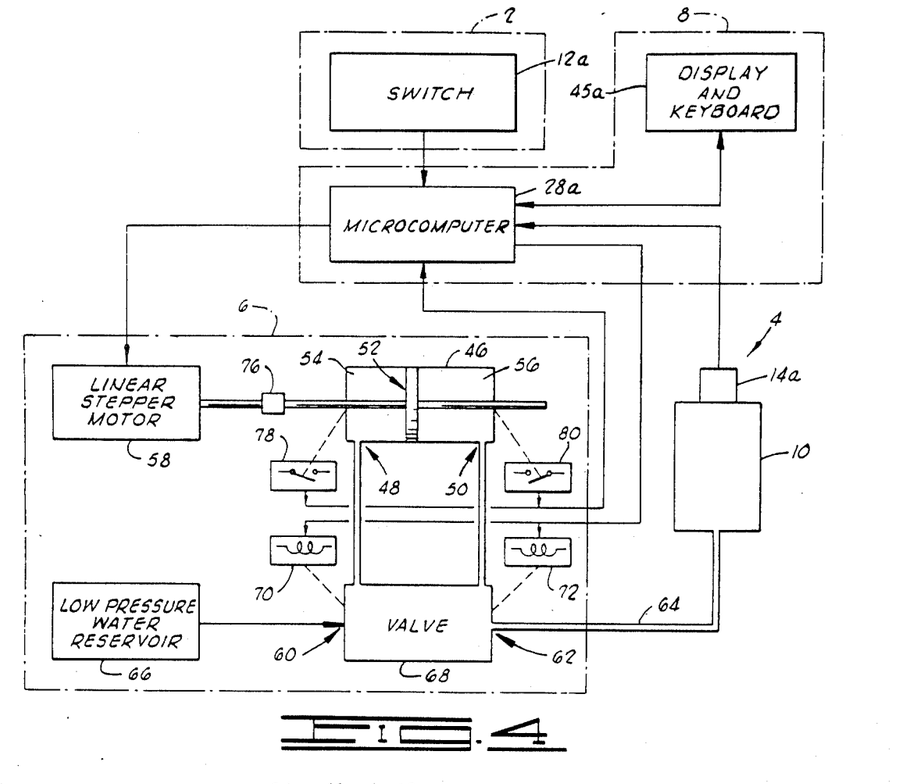
FIG. 4 is a block and schematic diagram of a second preferred embodiment of the present invention.

The second preferred embodiment of the volume adjustment means 6 includes a body 46 having a cavity, a first port 48, and a second port 50. The first and second ports are spaced from each other and extend between the cavity and the exterior of the body 46.

Movably disposed in the cavity of the body 46 is a member specifically illustrated as a double-acting piston 52. The head of the piston 52 defines a first portion 54 and a second portion 56 of the cavity of the body 46. The first portion 54 has the first port 48 communicating therewith, and the second portion 56 has the second port 50 communicating therewith.

The piston 52 is moved by motor means comprising in the second preferred embodiment a linear stepper motor means 58. The linear stepper motor means 58 includes in the preferred embodiment a linear stepper actuator for linearly moving the piston 52 to thereby vary the relative sizes of the cavity portions 54, 56. Other devices, such as rotary mechanisms as used in the first embodiment, can be used.

The first and second ports 48, 50 are selectably placed in fluid communication with the chamber 10 by suitable connector means. In the second preferred embodiment, the connector means includes valve means, having a fluid inlet 60 and a fluid outlet 62, for communicating the fluid inlet 60 with the first port 48 and for communicating the fluid outlet 62 with the second port 50 when the valve means is in a first state and for communicating the fluid inlet 60 with the second port 50 and for communicating the fluid outlet 62 with the first port 48 when the valve means is in a second state. The fluid outlet 62 is connected to the chamber 10 by suitable conduit means 64. In the second preferred embodiment, the fluid inlet 60 is connected to a low pressure water reservoir 66.

In FIG. 4, the valve means is shown to include a valve body and a valve element collectively illustrated as a "valve" marked with the reference numeral 68. Associated with the valve 68 is means for moving the valve element of the valve 68 between first and second positions when the piston 52 moves to predetermined locations in the cavity of the body 46. The moving means is shown in FIG. 4 to include a first electrical coil 70 for moving the valve element to a first position when the first electrical coil is energized. The moving means also includes a second electrical coil 72 for moving the valve element to a second position when the second electrical coil is energized. The coils 70, 72 form parts of solenoids which are actuated in response to signals from the microcomputer means 28a.

Figure 5:
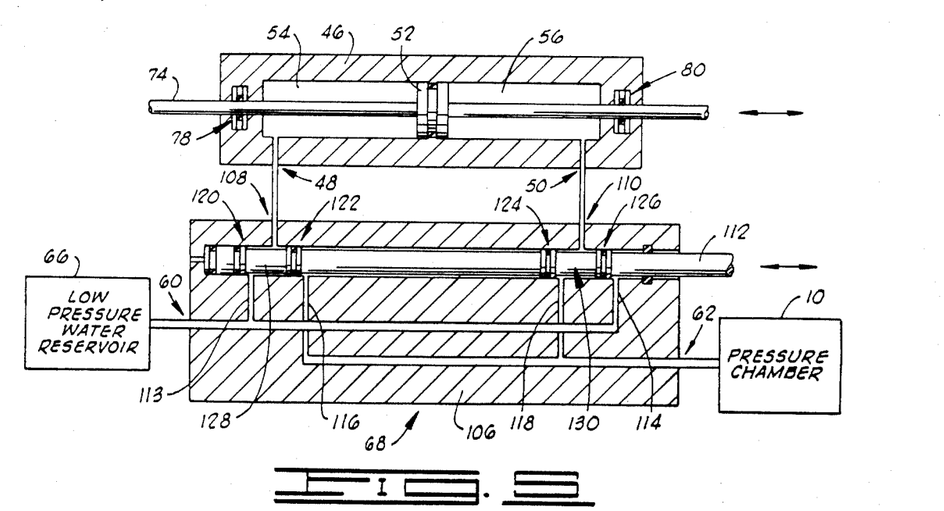
FIG. 5 is a schematic illustration of a portion of the volume adjustment means of the second preferred embodiment.

With reference to FIGS. 5-7, a more detailed description of the body 46, the piston 52, and the valve 68, which elements function in part to provide a pumping action to the second preferred embodiment, will be described. In FIG. 5, the body 46 is shown as a cylinder housing the double-acting piston 52. The double-acting piston 52 has a piston rod 74 which is coupled to the drive shaft of the linear stepper motor 58 by a suitable coupling means 76 schematically represented in FIG. 4. Also housed within the body 46 are first switch means 78 for causing a first limit control signal to be sent to the microcomputer means 28a when the piston 52 moves to a first predetermined location and second switch means 80 for causing a second limit control signal to be sent to the microcomputer means 28a when the piston 52 moves to a second predetermined location.

FIG. 6 more particularly describes a specific embodiment of the pumping mechanism provided by the body 46 and the piston 52. In the FIG. 6 embodiment, the body 46 is shown to include a housing 82 having end portions 84 and 86 suitably connected thereto. The connections are made fluid-tight by O-rings 88 and 90. The body 82 includes threaded connectors 92 and 94 defining the ports 48 and 50, respectively. The piston rod 74 is coupled to the linear stepper motor drive shaft by a suitable coupling block 96.

Disposed within the end portions 84 and 86 are respective switch receptacles 98 and 100 in which the switches 78 and 80, respectively, are disposed. The switch 78 is actuated when the piston rod 74 moves sufficiently to the right as viewed in FIG. 6 to enable a first switch actuating mechanism 102 to cooperate with the switch 78. This sufficient movement defines the first predetermined location of the piston 52 and the first state of the valve means. The second switch 80 is actuated when a second switch actuating mechanism 104 cooperates with the switch 80 disposed in the receptacle 100. This occurs when the piston rod 74 is moved sufficiently to the left as viewed in FIG. 6. This leftwardmost movement defines the second location to which the piston 52 is movable and the second state of the valve means.

Again referring to FIG. 5, the valve 68 is shown to include a valve body 106 having the fluid inlet 60 and the fluid outlet 62 defined therein. The valve body 106 also includes a first opening 108 connectable to the first port 48. The valve body 68 also includes a second opening 110 spaced from the first opening 108 and connectable with the second port 50. These connections are made by suitable means and are illustrated in FIG. 5. The openings 108 and 110 extend to a hollow interior portion in which a valve element or spool 112 is disposed for movement between a first position wherein the fluid inlet 60 is in fluid communication with the first opening 108 and the fluid outlet 62 is in fluid communication with the second opening 110 and a second position wherein the fluid inlet 60 is in fluid communication with the second opening 110 and the fluid outlet 62 is in fluid communication with the first opening 108.

In the embodiment shown in FIG. 5, the fluid inlet 60 opens into a passageway having a first leg 113 and a second leg 114. The fluid outlet opens from a passageway having a first leg 116 and a second leg 118. Each of the legs 113-118 is suitably disposed in the valve body 106 to appropriately cooperate with fluid passageways 128, 130 defined within the hollow interior portion of the valve body 68 by portions of the valve spool 112, which passageways 128, 130 are defined between a first pair of fluid seals 120, 122 and a second pair of fluid seals 124, 126, respectively. With the valve spool 112 having the fluid seal pairs disposed as shown in FIG. 5, the valve spool 112 is in the aforementioned first position wherein the fluid inlet 60 is in fluid communication with the port 48 via the leg 113, the passageway 128 and the first opening 108 and the fluid outlet 62 is in fluid communication with the second port 50 via the second opening 110, the passageway 130, and the leg 118. By appropriately moving the valve spool 112 to the right (as viewed in FIG. 5) a suitable distance, the valve spool 112 is placed in its second position wherein the passageway 128 establishes fluid communication between the first port 48 and the leg 116 of the outlet passage and the passageway 130 establishes fluid communication between the second port 50 and the leg 114 of the fluid inlet passage. The positional control of the valve spool 112 is effected by the coils 70 and 72 as energized by signals from the microcomputer means 28a, which signals are generated thereby in response to the actuation of the respective switches 78 and 80 when the piston 52 moves to either of its extreme locations.

In the FIG. 5 embodiment, micron filters (not shown) can be inserted in the lines connecting the fluid inlet 60 with the low pressure water reservoir 66 and connecting the fluid outlet 62 with the pressure chamber 10.

An alternative configuration of the valve 68 is illustrated in FIG. 7. This alternative embodiment includes an opening 132 corresponding to the first opening 108 of the embodiment shown in FIG. 5. The alternative embodiment also includes an opening 134 corresponding to the second opening 110 shown in FIG. 5. The FIG. 7 embodiment also includes a fluid outlet 136 corresponding to the outlet 62 of the FIG. 5 embodiment, but which outlet 136 includes only a single leg communicating with the hollow interior portion in which a valve spool 138 corresponding to the valve spool 112 is disposed. The FIG. 7 embodiment still further includes two inlet passages 140 and 142 corresponding to the inlet 60 and inlet passage legs 112 and 114. The valve spool 138 shown in FIG. 7 is disposed in its second position whereby the first port of the body 46 would be in fluid communication with the fluid outlet 136 and the second port of the body 46 would be in fluid communication with the fluid inlet passage 142. When the valve spool 138 is shifted a sufficient distance to the left (as viewed in FIG. 7) in response to energization of the coil 70, the valve spool 138 would be in its first position wherein the first port would be in fluid communication with the fluid inlet passage 140 and the second port would be in fluid communication with the fluid outlet 136.

With reference to FIGS. 4 and 5, the operation of the second preferred embodiment will be described. Although made with specific reference to FIG. 5, this operation is equally applicable to the specific embodiments shown in FIGS. 6 and 7.

When the pressure chamber 10 is to be initially presurized, the microcomputer means 28a controls the linear stepper motor 58 to move the piston 52 between the first and second extreme locations thereof. Such movement causes the piston 52 to function as a pump. When the piston 52 reaches one of its extremes, the switch 78 or 80 located at that extreme is actuated to cause the microcomputer means 28a to energize the respective coil thereby moving the valve spool 112 to its opposite position thereby switching the flows of the fluid to the cavity of the body 46 and to the fluid outlet 62. For example, for the position of the valve 68 shown in FIG. 5, fluid from the low pressure water reservoir 66 is input into the cavity portion 54 via the fluid inlet leg 113, the passageway 128, the first opening 108, and the first port 48. Fluid which is already in the cavity portion 56 from a prior cycle of operation is flowed into the pressure chamber 10 via the second port 50, the second opening 110, the passageway 130, the leg 118 of the fluid outlet passage and the fluid outlet 62. This flow of fluid into the pressure chamber 10 is brought about by control of the linear stepper motor 58 to move the piston rod 74 and the piston 52 to the right as viewed in FIG. 5. When the piston 52 has moved to its rightmost extreme whereby the switch 80 is actuated, the second coil 72 is energized thereby causing the valve spool 112 to move to its second position wherein the passageway 128 communicates the fluid outlet 62 with the first port 48 and the passageway 130 communicates the fluid inlet 60 with the second port 50. This actuation of the switch 80 also causes the microcomputer means 28a to signal the linear stepper motor means 58 to reverse its direction of movement thereby causing subsequent movement of the piston rod 74 and the piston 52 to be to the left as viewed in FIG. 5. Movement of the piston 52 to the left displaces the fluid in the cavity portion 54 through the first port 48, the first opening 108, the passageway 128, the leg 116 and the fluid outlet 62. Movement of the piston 52 to the left also allows more fluid to enter the cavity portion 56 from the reservoir 66. When the piston 52 reaches its leftmost position, it actuates the switch 78 which causes the coil 70 to be energized thereby shifting the valve spool 112 back into the position illustrated in FIG. 5 and commencing a new sequence or cycle of pumping action. Such fullstroke pumping action occurs until the pressure detected in the chamber 10 approaches the magnitude of pressure selected by the switch means 12a. At this time, the microcomputer means 28a controls the linear stepper motor means 58 to simply move the piston rod 74 and the piston 52 back and forth by the predetermined increments of the stepper motor to adjust the effective volume in which the fluid in the effective volume of the chamber 10 is disposed. By such variation of the effective volume, the pressure in the chamber 10 is controlled.

In addition to providing a pumping action, the stepper motor 58, the piston 52, the valve 68 and their related elements can operate as a relief valve for the pressure chamber 10. Instead of moving the piston 52 in a direction to force fluid from cavity portions 54 or 56 into the pressure chamber 10, the piston 52 is moved in a direction to force the fluid back into the reservoir 66, thereby permitting fluid from the pressure chamber 10 to flow into the evacuated cavity portions. This procedure can be cyclically repeated in a manner analogous to the aforementioned pumping action so that substantial quantities of fluid can be removed or vented from the pressure chamber 10. This is desirable in providing an expansion volume, for example, when the temperature in the pressure chamber 10 increases.

Thus, the present invention is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. An apparatus for controlling pressure in a chamber, comprising:
   set point means for setting a magnitude of pressure which is to be maintained in said chamber;
   detector means for detecting the actual pressure in said chamber;
   a body having a cavity, a first port and a second port defined therein, said first and second ports extending between said cavity and the exterior of said body;
   connector means for connecting one of said first and second ports in fluid communication with said chamber, said connector means including valve means, having a fluid inlet and a fluid outlet, for communicating said fluid inlet with said first port and for communicating said fluid outlet with said second port when said valve means is in a first state and for communicating said fluid inlet with said second port and for communicating said fluid outlet with said first port when said valve means is in a second state, said fluid outlet being communicable with said chamber;

a member, movably disposed in said cavity, for defining first and second portions of said cavity, said first portion having said first port communicating therewith and said second portion having said second port communicating therewith;

motor means for moving said member to vary the sizes of said first and second portions, said motor means including stepper actuator means of linearly moving said member in said cavity; and computer means, responsive to said set point means and said detector means, for providing control signals to said motor means and said valve means when the magnitude of pressure which is to be maintained in said chamber is not within a predetermined range of the detected actual pressure.

2. An apparatus as defined in claim 1, wherein said valve means includes:

a valve body having said fluid inlet and said fluid outlet defined therein and further having both a first opening connected with said first port and a second opening connected with said second port;

a valve element disposed in said valve body for movement between a first position wherein said fluid inlet is in fluid communication with said first opening and said fluid outlet is in fluid communication with said second opening a second position wherein said fluid inlet is in fluid communication with said second opening and said fluid outlet is in fluid communication with said first opening; and means for moving said valve element between said first and second positions when said member moves to predetermined locations in said cavity.

3. An apparatus as defined in claim 1, wherein said means for moving said valve element includes:

first switch means, responsive to movement of said member to a first predetermined location, for providing a first limit control signal to said computer means;

second switch means, responsive to movement of said member to a second predetermined location, for providing a second limit control signal to said computer means;

a first electrical coil, responsive to a signal from said computer means generated in response to said first limit control signal, for moving said valve element to said first position when said first electical coil is energized; and a second electrical coil, responsive to a signal from said computer means generated in response to said second limit control signal, for moving said valve element to said second position when said second electrical coil is energized.

4. An apparatus for first pumping a quantity of fluid from a fluid source until a first pressure is thereby provided within a fluid-receiving volume of a pressure chamber and a connected volume and for thereafter adjusting the connected volume so that incremental changes from the first pressure to a second pressure are obtained from the same quantity of fluid, said apparatus comprising:

set point means for setting the magnitude of the second pressure which is to be provided in the pressure chamber;

detector means for detecting the actual pressure in the pressure chamber;

a body having a cavity, a first port and a second port defined therein, said first and second ports communicating with said cavity;

a piston movably disposed in said cavity for movement between two extreme locations within said cavity so that first and second portions having variable relative sizes are defined within said cavity, said first portion having said first port communicating therewith and said second portion having said second port communicating therewith;

a piston rod, having said piston disposed thereon, extending through said cavity and said body;

a first switch actuating member disposed on said piston rod on one side of said piston;

a second switch actuating member disposed on said piston rod on the other side of said piston;

first switch means, associated with said body, for providing a first limit control signal when said first switch actuating member actuates said first switch means;

second switch means, associated with said body, for providing a second limit control signal when said second switch actuating member actuates said second switch means;

piston movement means, connected to said piston rod, for moving said piston so that the relative sizes of said first and second portions of said cavity are varied and so that said first and second switch actuating members are moved into actuating association with said first and second switch means, respectively;

a valve body, having fluid inlet means for communicating with the fluid source to receive a pressurized flow of fluid therefrom and having fluid outlet means for communicating with the pressure chamber, said valve body also having defined therein both a first opening connected with said first port and a second opening connected with said second port;

a valve element disposed in said valve body for movement between a first position, wherein said fluid inlet means is in fluid communication with said first opening so that an amount of the fluid determined by the size of said first portion of said cavity flows into said first portion when said fluid source is connected to said fluid inlet means and wherein said fluid outlet means is in fluid communication with said second opening so that the variable size of said second portion of said cavity, and any amount of the fluid therein, is in communication with the volume of the pressure chamber when the pressure chamber is connected to said fluid outlet means, and a second position, wherein said fluid inlet means is in fluid communication with said second opening so that an amount of the fluid determined by the size of said second portion of said cavity flows into said second portion when said fluid source is connected to said fluid inlet means and wherein said fluid outlet means is in fluid communication with said first opening so that the variable size of said first portion of said cavity, and any amount of the fluid therein, is in communication with the volume of the pressure chamber when the pressure chamber is connected to said fluid outlet means;

valve element movement means for moving said valve element between said first and second positions; and microcomputer means, responsive to the magnitude of the second pressure set by said set point means and to the actual pressure detected by said detector means, for controlling said piston movement means when the magnitude of the second pressure which is to be provided in the pressure chamber is not within a predetermined range of the detected actual pressure, said microcomputer means including:

full stroke pumping control means for actuating said piston movement means to move said piston between said two extreme locations so that a respective one of said first and second switch actuating members engages the respective one of said first and second switch means, and for actuating said valve element movement means to move said valve element from whichever of its first or second position it is then located to the other of its first or second position in response to the respective one of said first and second limit control signals provided when a respective one of said two extreme locations is reached by said piston, whereby said piston functions as a pump to inject additional fluid into a pressurized volume, including the volume of the pressure chamber and the volume of the first or second portion of said cavity connected to the pressure chamber and the volume defined through said valve body and valve element between the pressure chamber and the connected portion of said cavity, until the detected actual pressure reaches the first pressure; and incremental pressure adjustment means for actuating said piston movement means so that said piston is incrementally moved to either increase or decrease the size of the first or second portion of said cavity which is then in communication with the volume of the pressure chamber to thereby decrease or increase the pressure exerted therein by the quantity of the fluid then contained in said pressurized volume, whereby the pressure in the pressure chamber is incrementally changed from the first pressure to the preset magnitude of the second pressure.

* * * * *

UNITED STATES PATENT AND TRADEMARK OFFICE
CERTIFICATE OF CORRECTION

PATENT NO. : 4,575,313

DATED : March 11, 1986

INVENTOR(S) : Rao et al.

It is certified that error appears in the above-identified patent and that said Letters Patent is hereby corrected as shown below:

In column 3, line 45, delete the word [driven] and insert therefor --drive--.
In column 9, line 14, delete the word [of] and insert therefor --for--.
In column 9, line 33, following the word "opening" insert the word --and--.
In column 9, line 40, following the word "claim" delete the numeral [1] and insert therefor --2--.

Signed and Sealed this

Second Day of December, 1986

Attest:

DONALD J. QUIGG

Attesting Officer

Commissioner of Patents and Trademarks